(12) United States Patent
Lazri et al.

(10) Patent No.: US 10,659,475 B2
(45) Date of Patent: May 19, 2020

(54) METHOD OF DETECTING ATTACKS IN A CLOUD COMPUTING ARCHITECTURE

(71) Applicant: Orange, Paris (FR)

(72) Inventors: Kahina Lazri, Paris (FR); Sylvie Laniepce, Caen (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/115,495

(22) PCT Filed: Jan. 21, 2015

(86) PCT No.: PCT/FR2015/050147
§ 371 (c)(1),
(2) Date: Jul. 29, 2016

(87) PCT Pub. No.: WO2015/114236
PCT Pub. Date: Aug. 6, 2015

(65) Prior Publication Data
US 2017/0163661 A1 Jun. 8, 2017

(30) Foreign Application Priority Data
Jan. 30, 2014 (FR) .................................. 14 50763

(51) Int. Cl.
*H04L 29/06* (2006.01)
*G06F 21/55* (2013.01)
*G06F 9/455* (2018.01)

(52) U.S. Cl.
CPC ...... *H04L 63/1408* (2013.01); *G06F 9/45558* (2013.01); *G06F 21/552* (2013.01);
(Continued)

(58) Field of Classification Search
CPC ............. H04L 63/1408; G06F 9/45558; G06F 21/552; G06F 2009/4557; G06F 2009/45587
See application file for complete search history.

(56) References Cited

U.S. PATENT DOCUMENTS 8,739,172 B2 * 5/2014 Prakash S M ...... G06F 9/45558
705/7.12
2008/0163239 A1 * 7/2008 Sugumar ............... G06F 9/5088
718/105

(Continued)

FOREIGN PATENT DOCUMENTS

FR      2977050 A1    12/2012

OTHER PUBLICATIONS

JP201309556A. English Translation. (Year: 2013).*
(Continued)

*Primary Examiner* — Oleg Korsak
(74) *Attorney, Agent, or Firm* — David D. Brush; Westman, Champlin & Koehler, P.A.

(57) ABSTRACT

A method and a detection entity for detecting attacks in a system including at least two host servers. Each host server hosts a set of virtual machines. The detection entity performs acts of: detecting that a number of migrations of virtual machines from one server to another during a current time period is greater than a threshold value; partitioning the virtual machines of the system into a first subset having a stable profile of consumption of at least one resource, and into a second subset having a fluctuating profile; calculating, for the pairs of virtual machines of the second subset, a value of temporal correlation between the two profiles of the pair; and identifying in the second subset the virtual machines for which the correlation value is greater than or equal to a threshold correlation value, the machines being identified as constituting the origin of the attack.

9 Claims, 3 Drawing Sheets

(52) U.S. Cl.
CPC ............... *G06F 2009/4557* (2013.01); *G06F 2009/45587* (2013.01)

(56) References Cited

U.S. PATENT DOCUMENTS

| | | | | |
|---|---|---|---|---|
| 2010/0030877 | A1* | 2/2010 | Yanagisawa | G06F 9/5077 709/221 |
| 2012/0284408 | A1* | 11/2012 | Dutta | G06F 9/5066 709/226 |
| 2013/0304903 | A1* | 11/2013 | Mick | H04L 43/0817 709/224 |
| 2014/0040895 | A1* | 2/2014 | Peng | G06F 9/45533 718/1 |
| 2014/0067999 | A1* | 3/2014 | Lee | G06F 9/5088 709/217 |
| 2014/0223556 | A1 | 8/2014 | Bignon et al. | |
| 2016/0124765 | A1* | 5/2016 | Kaneko | G06F 9/45558 718/1 |

OTHER PUBLICATIONS

CN102541622. English Translation. (Year: 2011).*
JP2011128706. English Translation (Year: 2011).*
KR20160072465. English Translation. (Year: 2016).*
When Dynamic VM Migration Fall Under the Control of VM Users. Lazri et al. (Year: 2013).*
Bignon et al., FR2977050A1, published Dec. 28, 2012, English machine translation, 7 pages (Year: 2012).*
International Search Report dated Apr. 7, 2016 for corresponding International Application No. PCT/FR2015/050147, filed Jan. 21, 2015.
Zhang Shenzhong et al., "A Model Based Load-Balancing Method in IaaS Cloud", International Conferenc on Parallel Provessing, IEEE, Oct. 1, 2013 (Oct. 1, 2013), pp. 808-516, XP032534692.
Fatemeh Azmandian et al., "Virtual Machine Monitor-Based Lightweight Intrusion Detection", ACM SIGOPS Operating Systems Review, vol. 45, No. 2, Jul. 18, 2011 (Jul. 18, 2011), p. 38, XP055101403.
Claudia Canali et al., "Automated Clustering of VMs for Scalable Could Monitoring and Management", Software, Telecommunication and Computer Networks (Softcom), 2012 20th International Conference on, IEEE, Sep. 11, 2012 (Sep. 11, 2012), pp. 1-5, XP032470550.
Engilsh translation of the Written Opinion dated Apr. 7, 2016 for corresponding International Application No. PCT/FR2015/050147, filed Jan. 21, 2015.

* cited by examiner

METHOD OF DETECTING ATTACKS IN A CLOUD COMPUTING ARCHITECTURE

CROSS-REFERENCE TO RELATED APPLICATIONS

This Application is a Section 371 National Stage Application of International Application No. PCT/FR2015/050147, filed Jan. 21, 2015, the content of which is incorporated herein by reference in its entirety, and published as WO 2015/114236 on Aug. 6, 2015, not in English.

FIELD OF THE DISCLOSURE

The present invention relates to a method for detecting attacks in a computing environment that is virtualized, that is to say rendered virtual.

It is particularly advantageously applicable in the securing of computing systems with an architecture that is based on dematerialized computing resources, made available to a large number of users who access them remotely and in different ways over time, that is to say on demand. Such an architecture is better known as a "cloud computing" architecture. The concept of cloud computing describes computing architectures in which computer processing operations traditionally located in client stations of users of an enterprise, or on servers of the enterprise, are located remotely on remote servers.

BACKGROUND OF THE DISCLOSURE

A cloud computing architecture relies on a dematerialization based on a virtualization of physical resources. Virtualization involves making several operating systems run on a single computer, or host server, as if they were running on different servers. Virtual environments called virtual machines are thus offered to the users.

Cloud computing architectures are offered to clients with guarantees of service and of availability negotiated by agreement and through pricing matched to the resources which are allocated. In order to maximize the use of the capacities in terms of resources and thereby maximize the economic performance of the cloud computing offers, the resources are generally oversubscribed. Thus, the total quantity of resources configured for the set of virtual machines present on a host server is greater than that actually available on this host. In effect, it is estimated that, most of the time, each of the virtual machines does not seek to consume all the resources configured, or in any case, not at the same time as the other virtual machines co-located on the same host server.

In order to offer clients access at all times to resources in accordance with the terms of the agreement that they have negotiated, resource contention management mechanisms are put in place. They make it possible to balance the use of the resources in real time on a host server, even on a set of host servers.

For example, when there is a rise in the load of a virtual machine hosted by a host server which, upon this rise in load reaches its capacity limit, the resource need of this virtual machine is assessed against other virtual machines co-located on the same host server in order to allocate additional resources to it. An allocation of additional resources can then consist in moving the virtual machine concerned to another host server which has sufficient resources, or in moving machines located on the same host server as this virtual machine to another host server in order for it to have more resources, or even in duplicating the virtual machine on several host servers so as to meet the increased resource needs.

However, such a resource contention management mechanism, implemented to cope with a demand for additional resources originating from a virtual machine, can affect one or more other virtual machines. Thus, when a virtual machine is migrated from a source host server to a destination host server, the migrated machine can suffer from a degradation of performance levels that can vary according to the load of the source host server and/or of the destination host server, according to the load of the virtual machine and the nature of the applications that it runs. Upon the migration, the virtual machine may, in the worst case, suffer an unacceptable occasional loss of connectivity (the term normally used to describe this loss of connectivity is "down time").

The implementation of a contention management mechanism in a virtual machine to satisfy the increased resource needs of another virtual machine can therefore have a considerable impact on the virtual machine. This fault of isolation of a virtual machine with respect to events occurring in another virtual machine constitutes a new type of security vulnerability. Malicious people can thus exploit this fault by deliberately provoking variations in the quantity of resources consumed in first virtual machines, in order to trigger resource contention management mechanisms producing their effects in other virtual machines. This constitutes a new form of attack which is as yet not dealt with as such. In effect, the detection of attacks is generally focused on a resource space manipulated directly by an attacker: the attacker manipulates and attacks the resources of this space and the known attack detection methods are focused only on this resource space. Thus, no attack is detected on machines which do not form part of this space. With this new type of attack, the harmful effect is obtained as it were by edge effect. The current attack detection mechanisms are unsuited to detecting and analyzing this new type of attack.

SUMMARY

One of the aims of the invention is to remedy the inadequacies/drawbacks of the prior art and/or provide improvements thereto.

To this end, the invention proposes a method for detecting attacks in a system comprising at least two host servers, a host server being intended to host a set of virtual machines, the method comprising the following steps, implemented by a detection entity of the system:
  detection that a number of migrations of virtual machines from one server of the system to another during a current time period is greater than a threshold value,
  partitioning of the set of virtual machines of the system into a first subset of virtual machines, said to have stable profile in terms of consumption of at least one resource, and into a second subset, said to have fluctuating profile, the partitioning being dependent on a fluctuation index representative, for a machine of the set, of a variation of the consumption of the resource over a time window, the machines of the first subset having a lower fluctuation index than the machines of the second subset,
  computation, for the pairs of virtual machines of the second subset, of a time correlation value between the two profiles of the pair,
  identification in the second subset of virtual machines for which the correlation value is greater than or equal to a threshold correlation value, said machines being identified as originating the attack.

The method of the invention thus makes it possible to detect a new type of vulnerability in a cloud computing architecture, more specifically in a system comprising a cluster of host servers. The new type of vulnerability, linked to the degradation of the performance levels of a virtual machine inherent in the implementation of migrations of virtual machines from one host server to another, is exploited by an attacker who, after having taken control of several virtual machines, influences the consumption of a critical resource by these machines in order to trigger the untimely migrations of virtual machines in the system of host servers. These migrations, usually implemented occasionally to cope with occasional rises in the consumption load of a resource are then more numerous than in a case of normal operation of the system and provoke a degradation of the performance levels of the system as a whole. In effect, the migrations have a cost and impact the bandwidth which is used to transmit information concerning the migrated virtual machine; they also impact the memory and processor consumptions of the source and destination host servers upon the migration.

The method makes it possible to detect an attack that is not detectable with known means. In effect, on the one hand, the degradation of the performance levels is not linked to the behavior of just one machine which could then be rapidly identified, but is dependent on its behavior and provoked by coordinated actions of several virtual machines. The observation of each of these machines in isolation does not therefore make it possible to suspect an attack and raise a security alert. On the other hand, the degradation of the performance levels is not felt on one or more machines of which the attacker would have taken control and which would knowingly be the objective of the attack, but on virtual machines that are not compromised which suffer, by edge effect, the damage resulting from an implementation of an excessively large number of migrations in the system of servers, or cluster.

The attack detection method also makes it possible to identify the set of virtual machines which are manipulated by the attacker to perpetrate the attack. In effect, by virtue of the method, the virtual machines which exhibit a fluctuating resource consumption profile and which are correlated in time are identified. It is in fact estimated that the untimely migrations are provoked mainly by the execution of extremely fluctuating consumption profiles which thereby have a significant impact on the distribution of the load of the host servers which make up the system. The identification of the virtual machines originating the attack makes it easier to put in place measures intended to end the attack.

According to an exemplary embodiment, the method comprises a step of computation of a fluctuation vector representative, for the virtual machine of the set, of the fluctuation index computed at successive instants by displacement of the time window by one step, said step being associated with a resource consumption measurement reading, said vector being used during the step of partitioning of the set of virtual machines.

The steps of the method are triggered upon the detection of an alert. In order to determine, out of all the virtual machines of the system, those for which the consumption profile is fluctuating, a regular reading of consumption of a resource is performed and a fluctuation index vector is continually constructed. This fluctuation index vector is representative of a variation of the consumption of a resource over a given period defined by the duration of the time window. A value of this vector is computed by establishing a difference during a time period equal to the time window, between the maximum and minimum consumptions observed over that period. The partitioning algorithm is applied to this vector. That makes it possible to implement a continuous detection of attacks, without in any way requiring continuous computation capabilities.

In an exemplary embodiment of the invention, the time window is obtained by computing an average between times which separate two successive migrations during the current time period.

The time window is defined by the average of the durations which separate two successive migrations during the current time period during which an abnormally high number of migrations has been detected. It is known that the migration of a virtual machine from a source host server to a destination host server can be provoked by an attacker following a fluctuation, in terms of consumption of a resource, between extreme values. In effect, a migration is linked to the search for a balancing of the occupancy rates of the resources between the host servers within the cluster, subject to certain resource-level contention conditions. Once the migration has been implemented, the occupancy rate of the resource at the host server level becomes balanced again. Thus, by setting the time window as a function of the average time which separates two successive migrations, the chances of observing, during a time window, extreme resource consumption values, are increased. The chances of having clearly differentiated consumption values upon the computation of the fluctuation indices are therefore increased. The number of false positives and false negatives, that is to say the number of stable profiles, respectively fluctuating profiles, which would be wrongly partitioned in the subset of virtual machines with fluctuating, respectively fluctuating, profile is thus limited.

In an exemplary embodiment, the partitioning of the set of virtual machines is implemented by means of the k-means data partitioning algorithm.

The k-means algorithm is suited to the partitioning of the profiles into two distinct groups when k is set to 2. This algorithm is moreover suited to the processing of large quantities of data (the term scalability is usually used). Furthermore, parallel implementations of this algorithm can easily be implemented, which makes it highly suitable for use on platforms such as cloud computing platforms.

In an exemplary embodiment, the correlation value between two consumption profiles is computed by means of the canonical correlation analysis algorithm.

The canonical correlation analysis (CCA) algorithm is suited to the detection of a time correlation between the consumption profiles of the virtual machines which form part of the subset of virtual machines with fluctuating consumption profile identified by means of the k-means algorithm. The canonical correlation analysis algorithm is capable of reducing raw data, such as a memory consumption rate or a CPU consumption rate, to linearly independent data. That makes it possible to model the behavior of a virtual machine and compute the correlation on the extracted models and not directly on the raw data. That makes this technique robust to the noise introduced by the run time environment of the virtual machines.

In an exemplary embodiment, the resource for which the consumption is measured is the memory, measured as a percentage relative to the total memory allocated.

The computation of the time correlations is based on the observation of the consumption of the processor time by the different virtual machines of the system. This metric is advantageous because it is highly representative of what can influence the migration need of virtual machines within the system. Moreover, this metric is representative of real-time consumption by the virtual machines. The method, applied to the CPU consumption, therefore provides very reliable results.

In another exemplary embodiment, the resource for which the consumption is measured is the microprocessor, measured as a percentage of usage time.

In this example, the metric used by the method corresponds to the consumption of the memory by the different virtual machines of the system. This metric is also very representative of what can influence the migration need of virtual machines within a system.

In an exemplary embodiment, the method comprises, when at least two virtual machines which run on one and the same host server form part of the virtual machines originating the attack, a step of definition of an exclusion rule intended to prohibit, upon a subsequent migration, the two virtual machines from running on the same host server.

The detection method contributes to the putting in place of countermeasures intended to remedy the attack detected by defining, from the context of the attack, one or more rules on the placement of the virtual machines on the different host servers on subsequent migrations. Such measures are intended to reduce the capacities of the attacker to do harm by preventing configurations that lend themselves to the triggering of an attack.

The invention relates also to an attack detection entity resident in a virtual layer of a host server and included in a system comprising at least two host servers, a host server being intended to host a set of virtual machines, the detection entity comprising:

detection means, arranged to detect that a number of migrations of virtual machines from one server of the system to another during a current time period is greater than a threshold value, partitioning means, arranged to partition the set of virtual machines of the system into a first subset of virtual machines, said to have stable profile in terms of consumption of at least one resource, and into a second subset, said to have fluctuating profile, the partitioning being dependent on a fluctuation index representative, for a machine of the set, of a variation of the consumption of the resource over a time window, the machines of the first subset having a fluctuation index lower than the machines of the second subset, computation means, arranged to compute, for the pairs of virtual machines of the second subset, a time correlation value between the two profiles of the pair, identification means, arranged to identify virtual machines in the second subset for which the correlation value is greater than or equal to a threshold correlation value, said machines being identified as originating the attack.

The invention relates also to an attack detection system comprising:

a cluster of servers comprising at least two host servers, a host server hosting a set of virtual machines, and a detection host server hosting a detection entity according to the invention.

The invention relates also to a computer program on a data medium and that can be loaded into the memory of a computer, the program comprising portions of code for the execution of the steps of the attack detection method according to the invention when the program is run on said computer.

The invention relates also to a data medium in which is stored the program according to the invention.

BRIEF DESCRIPTION OF THE DRAWINGS

Other features and advantages of the present invention will be better understood from the description and the attached drawings in which.

DETAILED DESCRIPTION OF ILLUSTRATIVE EMBODIMENTS

Figure 1:
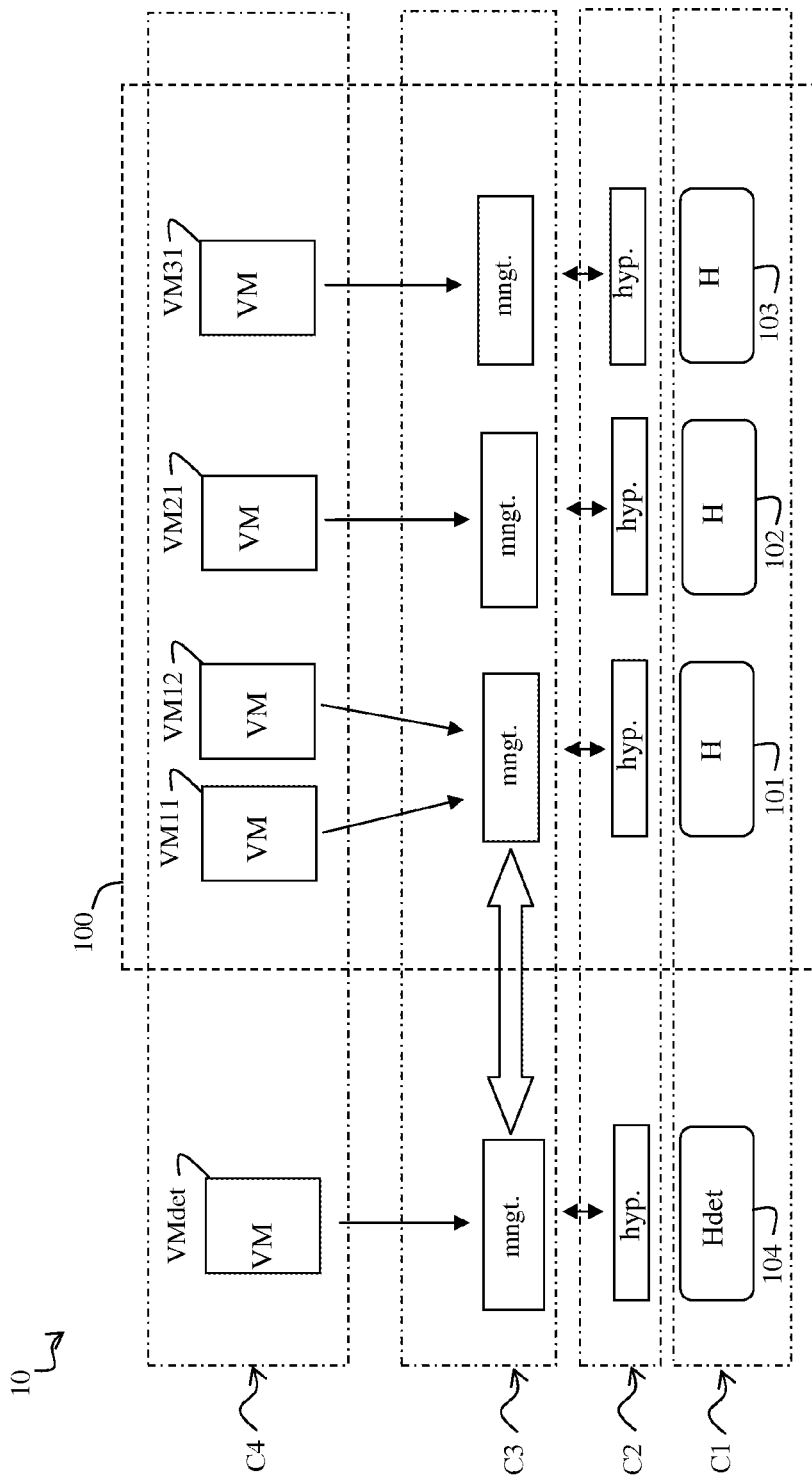
FIG. 1 is a schematic representation of a cloud infrastructure in which an attack detection method is implemented, according to an exemplary embodiment of the invention.

An architecture model suited to the implementation of an attack detection method, according to a first exemplary embodiment, will now be described in relation to FIG. 1.

A cloud computing infrastructure 10 comprises a set of host servers 101, 102, 103 organized in a cluster 100 of servers. Each host server 101, 102, 103 of the cluster 100 is adapted to host one or more virtual machines VM11, VM12, VM21, VM31. The infrastructure 10 also comprises a detection host server 104, adapted to host at least one attack detection entity VMdet. The detection entity VMdet is a virtual machine which comprises code instructions for implementing the steps of an attack detection method in the cluster 100.

As is known, a cloud computer architecture like the infrastructure 10 represented in FIG. 1 conforms to a model which comprises a number of execution layers. There are various models. In the example described here, the infrastructure 10 thus rests on a first execution layer, or hardware execution layer C1. This hardware execution layer C1 comprises a set of hardware resources of the host servers 101, 102, 103, 104. A hardware resource corresponds for example to memory, to a microprocessor, to a network interface, etc. A second execution layer is a virtualization layer C2. The virtualization layer C2 is adapted to present, to operating systems of the virtual machines VM11, VM22, VM12, VM13, VMdet, of a virtual layer C4, a virtual resource space, constructed from the space of the physical resources of the host servers 101, 102, 103, 104 of the hardware execution layer C1. The virtualization layer C2 is implemented by hypervisors which manage the allocation of the physical resources of the host servers between different virtual machine instances. A third execution layer is a management layer C3 for management of the architecture. The management layer C3 is adapted to create, instantiate, release and place the virtual machines VM11, VM12, VM21, VM31, VMdet run on the host servers 101, 102, 103, 104. The management layer C3 represents an interface between the virtualization layer C2 and other entities such as the virtual layer C4, architecture supervision tools, etc. Thus, it is through the management layer C3 that the detection entity VMdet interacts with the cluster 100 and supervises the operation of the set of virtual machines of the cluster 100. The virtual machine VMdet, as detection entity, has privileges that the virtual machines of the cluster 100 do not have and which enable it to obtain information relating to the operation of the set of virtual machines of the cluster 100. The detection entity VMdet is thus adapted to obtain measurements on the consumption of the resources made available to the virtual machines VM11, VM12, VM21, VM31 by the host servers 101, 102, 103. It is also adapted to obtain information relating to resource management mechanisms implemented in the cluster 100 to balance the use of the resources in real time on the host servers of the cluster 100. Such resource management mechanisms are intended to guarantee the virtual machines VM11, VM12, VM21, VM31 access at any moment to resources of the cluster 100 in accordance with the terms of an agreement that the users of these virtual machines have negotiated with a provider of the infrastructure, for example an operator. Such contention management is necessary because it is commonplace in cloud computing infrastructures for the total quantity of the resources configured for a set of virtual machines present in a cluster to be greater than that actually made available by the host servers of this cluster. In effect, it is estimated that, most of the time, each of the virtual machines does not seek to consume all the resources configured, or in any case, not at the same moment as the other virtual machines of the cluster. Such a contention management mechanism can consist in migrating a virtual machine from one host server to another within the cluster 100 in order to balance the load between host servers. A state of balance of the load guarantees a state of least contention at each server of the cluster 100.

In this exemplary embodiment, the detection entity VMdet is adapted to observe and count the number of migrations of virtual machines from one host server of the cluster 100 to another host server of the cluster 100.

Finally, a fourth execution layer is the virtual layer C4. The resources associated with this layer are the virtual machines VM11, VM12, VM21, VM13, VMdet which run in the virtual environments made available by the host servers 101, 102, 103, 104 as physical machines. The virtual machines are for example user virtual machines which can contain sensitive data or code to be protected. They can also be security virtual machines, like the detection entity VMdet dedicated to security and intended to protect the user virtual machines.

Three host servers and four virtual machines are represented in the cluster 100. Obviously, the invention is not limited to this configuration and it applies to clusters of different configuration in terms of number of host servers and of virtual machines hosted by these servers.

The detection entity VMdet is described here as a virtual machine hosted by a host server 104 which does not form an integral part of the cluster 100. Thus, the detection entity VMdet uses only physical resources offered by the detection host server 104. The invention is not limited to this exemplary embodiment and other architectures are possible. In another exemplary embodiment, the detection entity VMdet forms part of the cluster 100. In all cases, the virtual attack detection machine VMdet has particular privileges which allow it to supervise the operation of the other virtual machines of the architecture and to have an overview of the events which occur in the cluster 100. This supervision is done for example via the management layer C3 which has a view of all the hypervisors of the virtualization layer C2.

In another exemplary embodiment, the infrastructure 10 also comprises a known supervision tool, for example VMWare®, which can supervise the operation of the virtual machines of the cluster 100. The detection entity VMdet then obtains information relating to the supervision of the virtual machines of the cluster 100 from this supervision tool. In this example, the supervision tool counts the migrations within the cluster, makes regular measurements of consumption of the resources by the virtual machines of the cluster 100, etc. This information is then accessed and used by the detection entity VMdet to implement the attack detection method.

Figure 2:
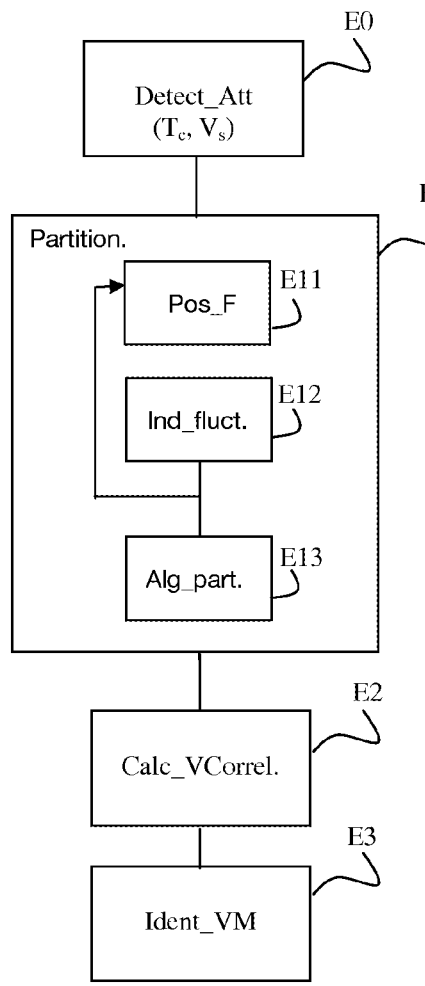
FIG. 2 presents the steps of the attack detection method in a cloud computing environment, according to an exemplary embodiment of the invention.

The steps of an attack detection method, according to a first exemplary embodiment, will now be described in relation to FIG. 2.

The method is executed in an environment conforming to the architecture described in relation to FIG. 1. In a preliminary phase (not represented in FIG. 2), virtual machines VM11, VM12, VM21, VM31, as well as a detection entity VMdet, capable of implementing the steps of the method described hereinbelow, have been created and instantiated. The detection entity VMdet supervises, in terms of security, the set of virtual machines of the cluster through the management layer C3. More specifically, it has a view of the set of virtual machines which form part of the cluster 100. It is notably adapted to obtain information concerning the use, by each of the virtual machines, of the physical resources of the host servers of the cluster 100. It is also adapted to obtain information concerning the implementation of mechanisms for dynamic management of the resources within the cluster. The dynamic management of the resources comprises contention management and load balancing at the cluster 100 level.

In a detection step E0, the virtual detection machine VMdet detects that the number of migrations of virtual machines from one host server to another within the cluster 100 during a current time period $T_c$ exceeds a threshold value $V_s$ previously computed over a reference period. For example, the reference period is an hour, or a day. The threshold value $V_s$ corresponds to a number of migrations per time period which is considered as normal in a normal state of operation of the cluster 100. This threshold value $V_s$ has been determined, for example, empirically by observing the operation of the cluster 100 and more specifically the migrations applied in the cluster 100 over one or more reference periods, and by calculating, for example, an average from these observations. It is assumed here that the number of migrations counted over the current time period $T_c$ of the same duration as the reference period is greater than the threshold value $V_s$. The detection of a number of migrations greater than the threshold value $V_s$ during the current period $T_c$ is categorized as an attack in progress. In effect, it is known that the migration of virtual machines consumes resources at the infrastructure level and can provoke a degradation of the performance levels in the migrated virtual machines. Upon such a migration, a virtual machine can, in the worst case, suffer an unacceptable one-off loss of connectivity (the term usually used to describe this loss of connectivity is "down time"). Thus, it is assumed that when the number of migrations of virtual machines within a cluster is abnormally high, then an attack is possibly in progress, conducted by a malicious person who has taken control of virtual machines and who has succeeded in coordinating them so as to trigger untimely migrations in order to degrade the performance levels of the architecture.

In a step E1 of partitioning of the virtual machines, the detection entity VMdet proceeds with an analysis of the resource consumption profiles of the virtual machines by partitioning the virtual machines of the cluster 100 into two separate subsets: a first subset, intended to group together the virtual machines whose profile is stable in terms of consumption of the resources of the cluster 100, more specifically of the host servers 101, 102, 103 of the cluster 100. A second subset is intended to group together the virtual machines whose profile is fluctuating in terms of consumption of the resources.

A virtual machine has a stable consumption profile if the measurement of the consumption of one or more resources over a given time period is relatively constant. On the other hand, if the measurement of consumption of a resource over the given time period exhibits erratic values, then the profile associated with the virtual machine is deemed fluctuating. More specifically, a statistical data analysis method is implemented in order to automatically obtain this partitioning. In this exemplary embodiment, the k-means partitioning algorithm is used. The aim of this algorithm is to classify the virtual machines according to the fluctuation of their resource consumption into two distinct subsets: a subset of virtual machines with stable profile and a subset of virtual machines with fluctuating profile. The algorithm divides observations into k-partitions such that the deviations of these observations from the average of the observations of each partition, are, in total, minimum and the distances from the centers of the partitions are as far apart as possible from one another.

The value "k", corresponding to the desired number of partitions is therefore set here to 2. The k-means partitioning algorithm analyzes the observations on a metric representative of a phenomenon that it is sought to partition. In the present invention, to apply the k-means partitioning algorithm, a metric is defined called "fluctuation index" to which the k-means algorithm is applied. The fluctuation index, computed for a virtual machine over a given time window, measures the fluctuation of the consumption of a resource by that machine during that given period. The fluctuation index is computed over this time window by calculating the difference between the maximum and minimum values of consumption of the resource observed in the time window considered. In this exemplary embodiment, the fluctuation index is measured relative to a memory consumption of a virtual machine. The memory consumption is itself indicated as a percentage of the overall capacity of the memory resources made available to the virtual machine by the cluster 100. By computing this fluctuation index over successive time windows, a set of fluctuation index values called "fluctuation index vector" is obtained. An example of construction of the fluctuation index vector for a virtual machine with a stable, respectively fluctuating, consumption profile, as detailed by means of the description of substeps E11, E12 and E13 of the partitioning step E1, is illustrated by means of FIG. 3A, respectively 3B.

Figure 3A:
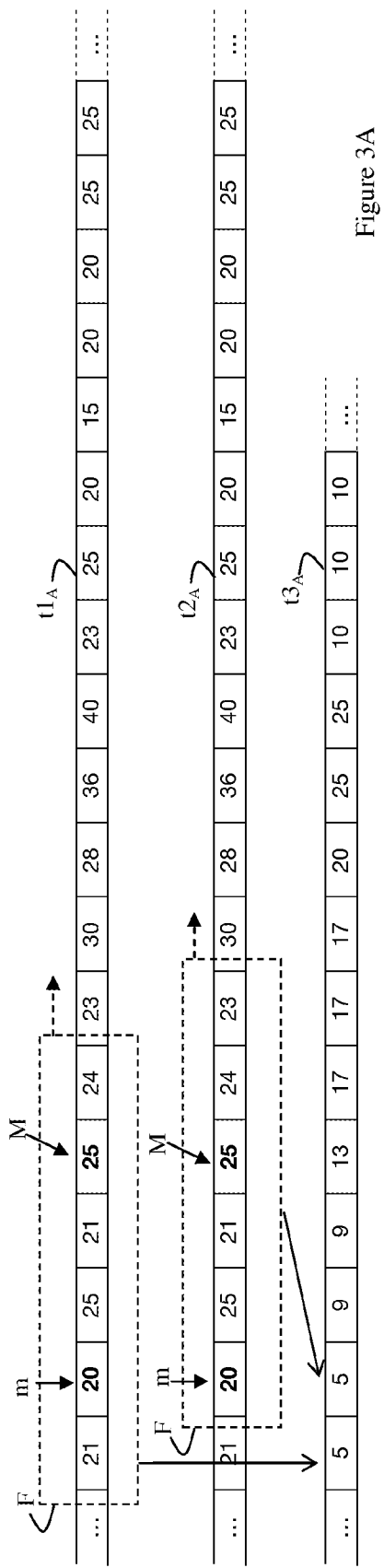
FIG. 3A, respectively 3B, constitutes a schematic representation of the computation of a fluctuation index vector for a virtual machine with stable consumption profile, respectively with fluctuating consumption profile, according to an exemplary embodiment of the invention.
Figure 3B:
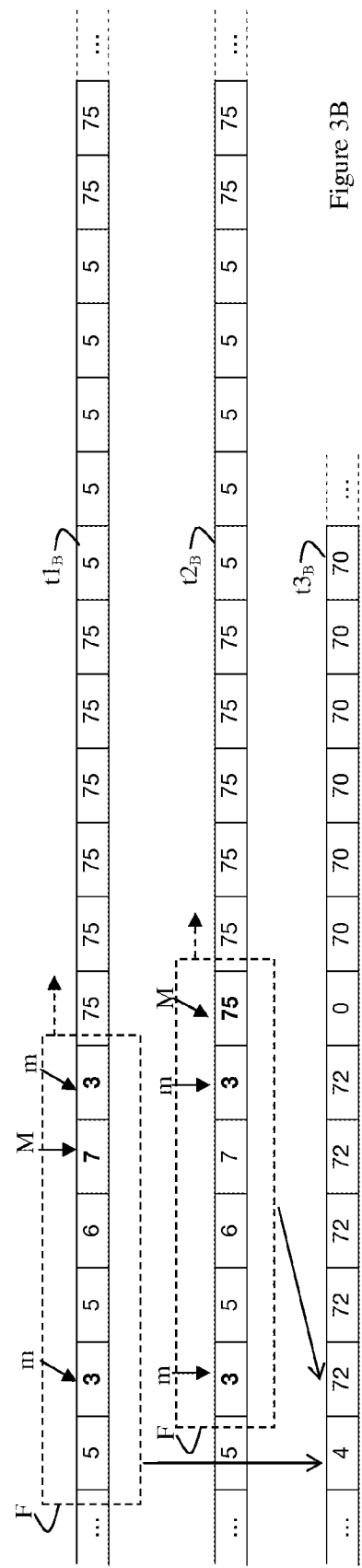

For each virtual machine of the cluster, a regular measurement of the consumption of a given resource is performed. The measurement is for example performed every 20 seconds. That corresponds to the duration between two successive measurements, or "step", which separates two measurements, observed by the detection entity VMdet. In FIGS. 3A and 3B, the measurements given in the tables with 1 row and n columns (or 1×n) $t1_A$, $t1_B$ correspond to the memory consumption of two distinct virtual machines of the cluster 100, for example the virtual machines VM11 and VM31.

Also defined is time window F within which the difference between the maximum M and minimum m consumption values present in the time window F is computed; this difference corresponds to the fluctuation index previously defined. The time window F is defined relative to the duration which separates two successive migrations in the cluster 100. More specifically, the time window F is an average value of the duration which separates two migrations observed during the reference period, that is to say during a period of normal operation of the cluster 100. By choosing the duration of the time window F according to the average of the durations which separate the successive migrations, the chances of having consumption values that are significantly differentiated within a window, illustrating consumption variations that it is sought to observe, are increased. Thus, the number of false positives and of false negatives is limited and the efficiency of the method is optimized.

In a substep E11 of the partitioning step E1, the time window F is positioned on a first position. This positioning of the sliding window F for the virtual machine VM11 is illustrated in FIG. 3A in table $t1_A$ and in table $t1_B$ for the virtual machine VM31.

In a substep E12 of computation of the fluctuation index, the difference between the maximum value M and the minimum value m of consumption of the resource contained in the time window F is computed. Referring to FIGS. 3A and 3B, it is therefore computed as 25–20 for the virtual machine VM11, and 7–3 for the virtual machine VM31. The difference obtained for the virtual machines VM11 and VM31 is entered in tables $t3_A$ and $t3_B$, which constitute the fluctuation index vector of the virtual machines.

The substeps E11 and E12 are then reiterated. The time window F is displaced to a next position, as illustrated in tables $t2_A$ and $t2_B$. The fluctuation index is computed for this next position of the sliding time window F.

The resulting tables $t3_A$ and $t3_B$ obtained constitute the fluctuation index vectors of the virtual machines VM11 and VM31. They comprise the fluctuation indices computed at regular intervals, that is to say on each displacement of the sliding time window F.

The virtual machines with fluctuating consumption profile produce a fluctuation index vector which exhibits more high values compared to virtual machines with stable consumption profile. In effect, the difference between the maximum value M and the minimum value m of consumption over a period equal to the time window F is often higher for a virtual machine with fluctuating consumption profile than for a virtual machine with stable consumption profile. Thus, it is possible to conclude from the tables $t3_A$ and $t3_B$ of FIGS. 3A and 3B that the virtual machine VM11 exhibits a stable consumption profile whereas the virtual machine VM31 exhibits a fluctuating consumption profile.

In a substep E13 of application of the partitioning algorithm, the k-means algorithm is applied to the fluctuation index vectors computed previously. The virtual machines of the cluster are then divided up into two distinct subsets: a first subset of virtual machines with stable consumption profile and a second subset of machines with fluctuating consumption profile. The k-means method is such that the consumption profile of a virtual machine belongs either to the first subset or to the second subset, unambiguously.

In a subsequent step E2 of computation of a correlation value, a statistical analysis algorithm is applied to the memory consumption values of the virtual machines which belong to the subset of virtual machines with fluctuating profile, taken two by two. In other words, for each pair of virtual machines identified as belonging to the subset of machines with fluctuating profile, the statistical analysis algorithm is applied to the memory consumption values recorded for these two virtual machines. The application of this algorithm is intended to identify, out of the profiles of the virtual machines, those which are over-correlated. In other words, the algorithm is applied to pairs of virtual machines, taken two by two.

It is estimated in fact that an attacker must control several virtual machines in order to affect their consumption profile correlatively so as to have enough influence on the load imbalance within the cluster. Thus, the attacker can influence the migration decisions of virtual machines within the cluster. The identification of the virtual machines originating the attack therefore concerns only the machines with fluctuating consumption profile and consists in identifying a time correlation between these machines. In order to implement this step E2 of identification of the correlated virtual machines, the canonical correlation analysis (CCA) algorithm is for example applied. The aim of the canonical correlation analysis is to compare groups of variables two by two in order to determine whether they describe one and the same phenomenon. Thus, the algorithm is applied to the memory consumption values of the virtual machines, taken two by two, and an n×n correlation matrix is computed which comprises, in the ith row and in the jth column, a correlation value between the memory consumption values associated with an ith virtual machine with fluctuating consumption profile and the memory consumption values associated with a jth virtual machine with fluctuating consumption profile. This value is representative of the time correlation between the ith virtual machine and the jth virtual machine of the second subset.

In an identification step E3, in the subset of virtual machines with fluctuating consumption profile, those which are originating the attack are identified. To this end, the correlation values computed previously are compared to a threshold correlation value above which it is estimated that the machines are abnormally correlated. Thus, if a correlation value computed for two virtual machines of the subset of virtual machines with fluctuating profile is greater than or equal to the correlation threshold value, then the two virtual machines are abnormally correlated and considered as very probably forming part of the virtual machines originating the attack. In this exemplary embodiment, the correlation threshold value is set to 0.8. This value has been set empirically. The threshold value takes account of the fact that attacking virtual machines cannot not be correlated and takes account of the fact that the fluctuation indices which are computed on the memory consumption exhibit a strong correlation in case of coordination of consumption profiles to conduct the attack.

The step E2 thus makes it possible to identify abnormally correlated virtual machines. These machines are identified as originating the attack.

With the detection method described here, the machines which have a fluctuating resource consumption profile, and out of these machines, those which fluctuate in a coordinated manner, more specifically, those for which the fluctuation is correlated, are first of all identified. Thus, a set of virtual machines linked together in their behavior represented by their resource consumption is determined. It is estimated that these machines are the origin of the alert generated by an abnormal number of virtual machine migrations.

The value of the time window F is self-adaptive, inasmuch as it is recomputed as a function of the change over time of the number of migrations of virtual machines.

The steps of the method are triggered upon the detection of an excessively high number of migrations and some of the steps implemented on a past consumption history. In effect, the attack is detected when the number of migrations of virtual machines within the cluster 100 exceeds the threshold value $V_s$. At that instant, the attack has already taken place, since too many untimely migrations have been observed. It is therefore appropriate to analyze what has led to this attack. The steps E1 of partitioning and E2 of computation of a correlation value are thus implemented from the consumptions of resources observed before the detection of the attack and more specifically during an analysis period $T_A$ greater than the current time period Tc and prior to the detection of the attack.

The analysis period $T_A$ can be computed as:

$$T_A = T_c + \Delta_t,$$

where $\Delta_t$ represents an additional duration, intended to take account of first signs of the attack. For example, $\Delta_t$ is set to 1 hour.

In the exemplary embodiment described here, the resource consumption measurements and the fluctuation index vectors are relative to the memory resource. In another exemplary embodiment, the resource of which the consumption is measured and which serves as a basis for the computation of the fluctuation index is a rate of use of the microprocessor resource, or "CPU" (Control Processing Unit) made available to the virtual machines and measured as a percentage of the usage time. In the case of the CPU resource an exemplary correlation threshold value $V_s$ is also 0.8. In effect, in the case of the CPU, the fluctuation indices also exhibit a strong correlation.

The method thus makes it possible to identify virtual machines for which resource consumption is strongly correlated. This correlation is the origin of untimely migrations of virtual machines within the infrastructure 10 which provoke a degradation of the performance levels. These virtual machines are identified as very probably participating in an attack. Once these virtual machines have been identified, countermeasures are put in place in order to mitigate the attack. In an exemplary embodiment, these countermeasures consist in introducing constraints as to the placement of these virtual machines on the host servers 101, 102, 103 of the cluster 100 so as to prohibit certain configurations. For example, if the two virtual machines VM11 and VM12 have been identified as strongly correlated upon the implementation of the attack detection method described previously, and if these two virtual machines are running on the same server, then a constraint is defined so as to subsequently exclude a colocation of these two virtual machines on one and the same host server. The constraint is defined for example by the virtual detection machine VMdet and taken into account by a dynamic resource management algorithm arranged to migrate a virtual machine from one host server to another. Thus, when a subsequent migration is decided, the constraint is taken into account and if the virtual machines VM11 and VM12 are concerned with this migration, they are separated, that is to say placed on distinct host servers. By recommending a mutual exclusion of these virtual machines, the capabilities of the attacker to influence the consumption of the resources of these virtual machines are reduced.

Figure 4:
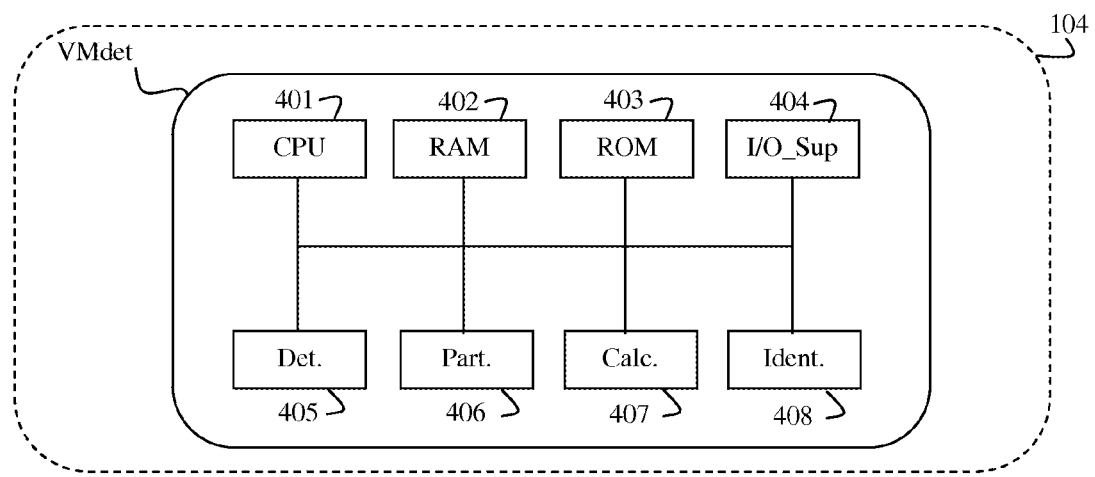
FIG. 4 is a schematic representation of an attack detection entity, according to an exemplary embodiment of the invention.

An attack detection entity VMdet implemented in a detection server (104), according to an exemplary embodiment of the invention will now be described in relation to FIG. 4.

The detection entity VMdet conforms to a computer equipment architecture such as a terminal or a server. According to the architecture model described in relation to FIG. 1, the attack detection entity VMdet is a virtual machine which resides in the virtual layer of the host detection server 104 (the host server is not represented in FIG. 4). It conventionally comprises:

- a microprocessor 401, or CPU (Central Processing Unit), intended to load instructions into memory, to execute them and to perform operations;
- a set of memories, including a volatile memory 402, or "RAM" (Random Access Memory) used to execute code instructions, store variables, etc., a storage memory 403 of "ROM" or "EEPROM" (Read Only Memory and Electronically-Erasable Programmable Read-Only Memory) type. The storage memory 403 is arranged to memorize an application which comprises code instructions for implementing the steps of the attack detection method in a system, as described in relation to FIG. 2;
- a supervision interface 404, arranged to supervise, through the management layer C3, the operation of the cluster and that of the virtual machines of the cluster 100. In particular the supervision interface 404 is arranged to obtain regular measurements, for each virtual machine of the cluster, of the consumption of the resources made available to the host servers of the cluster. It is also arranged to obtain information concerning the migrations of virtual machines from one host server to another within the cluster 100.

It will be understood, in light of the description of the cloud computing architecture model supplied in relation to FIG. 1, that the resources that the detection entity VMdet has, such as the CPU and the memory, are physical resources of the host detection server 104 which are virtualized and made available to the detection entity VMdet.

The detection entity VMdet also comprises:

- detection means 405, arranged to detect that a number of migrations of virtual machines from one server to another within the cluster during a current time period is greater than a threshold value. The detection means 405 are arranged to implement the detection step E0 of the attack detection method described previously;
- partitioning means 406, arranged to partition the set of virtual machines of the system into a first subset of virtual machines, said to have stable profile in terms of consumption of at least one resource, and into a second subset, said to have fluctuating profile, the partitioning being dependent on a fluctuation index representative, for a machine of the set, of a variation of the consumption of the resource over a time window F, the machines of the first subset having a lower fluctuation index than the machines of the second subset. The partitioning means 406 are arranged to implement the partitioning step E1 of the detection method described previously;
- computation means 407, arranged to compute, for the pairs of virtual machines of the second subset, a time correlation value between the two profiles of the pair. The computation means 407 are arranged to implement the step E2 of computation of a correlation value of the method described previously;
- identification means 408, arranged to identify virtual machines in the second subset for which the correlation value is greater than or equal to a threshold correlation value, said identified machines being identified as originating the attack. The identification means 408 are arranged to implement the identification step E3 of the method described previously.

The supervision interface 404, the detection means 405, the partitioning means 406, the computation means 407 and the identification means 408 are preferably software modules comprising software instructions for having the steps of the attack detection method described previously executed.

In an exemplary embodiment, the detection entity VMdet also comprises means for defining exclusion rules (not represented in FIG. 4), arranged to defined exclusion rules intended to prohibit two virtual machines which are running on the same host server and which have been identified as forming part of the virtual machines originating the attack from being migrated, upon a subsequent migration, on one and the same host server.

The invention therefore also relates to:

- a computer program comprising instructions for the implementation of the attack detection method as described previously when this program is run by a processor of the detection entity VMdet,
- a readable storage medium on which is stored the computer program described above.

The software modules can be stored in, or transmitted by, a data medium. The latter can be a hardware storage medium, for example a CD-ROM, a magnetic diskette or a hard disk, or else a transmission medium such as a signal or a telecommunication network.

The invention relates also to an attack detection system 10 which comprises a cluster of servers 100 comprising at least two host servers, a host server hosting a set of virtual machines, and a detection host server 104 hosting a detection entity VMdet.

Although the present disclosure has been described with reference to one or more examples, workers skilled in the art will recognize that changes may be made in form and detail without departing from the scope of the disclosure and/or the appended claims.

The invention claimed is:

1. A method for detecting attacks in a system comprising at least two host servers, each host server being configured to host a set of virtual machines, the method comprising the following acts, implemented by a detection entity of the system:

- computation of a number of migrations of virtual machines for said system over a current time period, said number being representative of the number of virtual machines being migrated from one host server of said system to another host server of said system over said current time period, said migration being detected by the detection entity through a network interface, and
- detection that the computed number of migrations is greater than a threshold value, said detection detecting an attack and triggering the further following acts:
- computation for each virtual machine of said system of a fluctuation index representative of a variation of consumption of at least one resource over a time window, said fluctuation index being obtained by calculating over the time window a difference between a maximal value and a minimal value of consumption of a resource during this time window,
- constructing for each virtual machine a vector of fluctuation comprising successive differences between the maximal value and the minimal value obtained for a virtual machine;
- partitioning the virtual machines of the system by applying an algorithm of partitioning on the vectors of fluctuation of the virtual machines in order to obtain a plurality of subsets, comprising a first subset comprising the virtual machines having a stable profile in terms of consumption of said at least one resource, and a second subset comprising the virtual machines having a fluctuating profile;

pairing each virtual machine of the second subset with at least one other virtual machine of the second subset to form at least one pair of virtual machines, and computing, for each pair of virtual machines of the second subset, a time correlation value between the two profiles of the pair, said time correlation value being calculated by applying a statistical algorithm to the consumption values of the virtual machines of the pair; and identification in the second subset of pairs of virtual machines for which the time correlation value is greater than or equal to a threshold correlation value, meaning that the virtual machines of the pair are abnormally correlated, said virtual machines being identified as originating the attack.

2. The method as claimed in claim 1, in which the time window is obtained by computing an average between times which separate two successive migrations during the current time period.

3. The method as claimed in claim 1, in which the partitioning of the virtual machines is implemented by using a k-means data partitioning algorithm.

4. The method as claimed in claim 1, in which the correlation value between two consumption profiles is computed by using a canonical correlation analysis algorithm.

5. The detection method as claimed in claim 1, in which the resource for which the consumption is measured is memory, measured as a percentage relative to a total memory allocated.

6. The method as claimed in claim 1, in which the resource for which the consumption is measured is a microprocessor, measured as a percentage of usage time.

7. The method as claimed in claim 1, comprising, when at least two virtual machines which run on one and the same host server form part of the virtual machines originating the attack, an act of defining an exclusion rule to prohibit, upon a subsequent migration, the two virtual machines from running on the same host server.

8. A detection server comprising:
a network interface;
a virtual layer;
an attack detection entity resident in the virtual layer of the detection server and included in a system comprising at least two host servers, each host server hosting a set of virtual machines, the detection entity comprising:
a processor; and
a non-transitory computer-readable medium comprising instructions stored thereon, which when executed by the processor configure the detection entity to perform acts comprising:
computation of a number of migrations of virtual machines for said system over a current time period, said number being representative of the number of virtual machines being migrated from one host server of said system to another host server of said system over said current time period, said migration being detected by the detection entity through a network interface; and
detection that the computed number of migrations is greater than a threshold value, said detection detecting an attack and triggering the further following acts:
computation for each virtual machine of said system of a fluctuation index representative of a variation of consumption of at least one resource over a time window, said fluctuation index being obtained by calculating over the time window a difference between a maximal value and a minimal value of consumption of a resource during this time window,
constructing for each virtual machine a vector of fluctuation comprising successive differences between the maximal value and the minimal value obtained for a virtual machine;
partitioning the virtual machines of the system by applying an algorithm of partitioning on the vectors of fluctuation of the virtual machines in order to obtain a plurality of subsets, comprising a first subset comprising the virtual machines having a stable profile in terms of consumption of said at least one resource, and a second subset comprising the virtual machines having a fluctuating profile;
pairing each virtual machine of the second subset with at least one other virtual machine of the second subset to form at least one pair of virtual machines, and computing, for each pair of virtual machines of the second subset, a time correlation value between the two profiles of the pair, said time correlation value being calculated by applying a statistical algorithm to the consumption values of the virtual machines of the pair; and
identifying virtual machines in the second subset of pairs of virtual machines for which the time correlation value is greater than or equal to a threshold correlation value, meaning that the virtual machines of the pair are abnormally correlated, said virtual machines being identified as originating the attack.

9. An attack detection system comprising:
a cluster of servers comprising at least two host servers, each host server hosting a set of virtual machines, and
a detection server comprising:
a network interface;
a virtual layer;
an attack detection entity resident in the virtual layer of the detection server and comprising:
a processor; and
a non-transitory computer-readable medium comprising instructions stored thereon, which when executed by the processor configure the attack detection entity to perform acts comprising:
computation of a number of migrations of virtual machines for said system over a current time period, said number being representative of the number of virtual machines being migrated from one host server of said system to another host server of said system over said current time period, said migration being detected by the detection entity through a network interface; and
detection that the computed number of migrations is greater than a threshold value, said detection detecting an attack and triggering the further following acts:
computation for each virtual machine of said system of a fluctuation index representative of a variation of consumption of at least one resource over a time window, said fluctuation index being obtained by calculating over the time window a difference between a maximal value and a minimal value of consumption of a resource during this time window,
constructing for each virtual machine a vector of fluctuation comprising successive differences between the maximal value and the minimal value obtained for a virtual machine;

partitioning the virtual machines of the system by applying an algorithm of partitioning on the vectors of fluctuation of the virtual machines in order to obtain a plurality of subsets, comprising a first subset comprising the virtual machines having a stable profile in terms of consumption of said at least one resource, and a second subset comprising the virtual machines having a fluctuating profile;

pairing each virtual machine of the second subset with at least one other virtual machine of the second subset to form at least one pair of virtual machines, and computing, for each pair of virtual machines of the second subset, a time correlation value between the two profiles of the pair, said time correlation value being calculated by applying a statistical algorithm to the consumption values of the virtual machines of the pair; and identifying virtual machines in the second subset of pairs of virtual machines for which the time correlation value is greater than or equal to a threshold correlation value, meaning that the virtual machines of the pair are abnormally correlated, said virtual machines being identified as originating the attack.

* * * * *